United States Patent
Fukuda et al.

(10) Patent No.: US 6,197,248 B1
(45) Date of Patent: Mar. 6, 2001

(54) PROCESS FOR PREPARING ALUMINUM TITANATE POWDER AND SINTERED BODY

(75) Inventors: Tsutomu Fukuda, Kakogawa; Masahiro Fukuda, 3-3-326, Takamaru 7-chome, Tarumi-ku, Kobe-shi, Hyogo-ken, both of (JP)

(73) Assignees: Tsutomo Fukuda, Kakogawa; Masahiro Fukuda, Kobe; Masaaki Fukuda, Osaka, all of (JP)

( * ) Notice: Subject to any disclaimer, the term of this patent is extended or adjusted under 35 U.S.C. 154(b) by 0 days.

(21) Appl. No.: 09/369,278

(22) Filed: Aug. 6, 1999

(51) Int. Cl.$^7$ ................................................. C04B 33/32
(52) U.S. Cl. ........................... 264/658; 423/598; 501/127
(58) Field of Search ............................ 264/658; 501/127; 423/598

(56) References Cited

U.S. PATENT DOCUMENTS

| | | | |
|---|---|---|---|
| 2,776,896 | * | 1/1957 | Harman et al. . |
| 3,734,702 | * | 5/1973 | Veres ........................................ 65/43 |
| 4,746,638 | * | 5/1988 | Hori et al. ............................ 501/127 |
| 5,032,376 | * | 7/1991 | Kladnig ................................. 423/598 |
| 5,340,783 | * | 8/1994 | Anderson et al. .................... 501/134 |

FOREIGN PATENT DOCUMENTS

| | | |
|---|---|---|
| 5-279116 | 10/1993 | (JP) . |
| 7-17764 | 1/1995 | (JP) . |
| 11-60240 | 3/1999 | (JP) . |

* cited by examiner

Primary Examiner—Christopher A. Fiorilla
(74) Attorney, Agent, or Firm—Armstrong, Westerman, Hattori, McLeland & Naughton

(57) ABSTRACT

A process for preparing a powder of aluminum titanate, including the steps of subjecting to pressure molding a mixture of 100 parts by weight of a mixture of $Al_2O_3$ and $TiO_2$ at a molar ratio of the former: the latter of 1:0.95–1.05, 2 to 5 parts by weight of $SiO_2$, 2 to 5 parts by weight of iron oxide calculated as $Fe_2O_3$ and 1 to 3 parts by weight of a powder of an organic substance; sintering the molded product at a temperature of 1600 to 1700° C. in a closed container; and pulverizing the molded product. A further process for preparing a sintered body of aluminum titanate includes the steps of molding the powder of aluminum titanate obtained by the above-mentioned process and sintering the molded product at 1450 to 1550° C.

4 Claims, No Drawings

PROCESS FOR PREPARING ALUMINUM TITANATE POWDER AND SINTERED BODY

FIELD OF THE INVENTION

The present invention relates to a process for preparing a powder of aluminum titanate and to a process for preparing a sintered body of aluminum titanate.

PRIOR ART

Aluminum titanate ($TiAl_2O_5$) ceramics were heretofore known as having high cutting capability and machinability. Aluminum titanate is a compound having a high melting point of 1860° C. However, aluminum titanate materials conventionally used have low purity and contain oxides such as $Al_2O_3$, $TiO_2$ or the like. Consequently molded products of these materials can not exhibit the inherent heat resistance of aluminum titanate due to a large amount of impurities present therein. At high temperatures, such molded products tend to form small cracks in the interior and show poor physical strength. Thus said molded products are unsatisfactory as heat-resistant products for use at high temperatures.

Various ceramics usable at high temperatures are known and include, for example, those made of oxides (such as alumina, mullite, magnesia, zirconia and the like), carbides, nitrides, borides and the like. Such ceramics have limited applications because they are susceptible to thermochemical erosion and can not be machined because of low cutting capability.

DISCLOSURE OF THE INVENTION

A main object of the present invention is to provide a process for preparing ceramics which are excellent in cutting capability and thus capable of being machined, further the ceramics being outstanding in heat resistance and stably usable for a long term in high temperature environments.

The present inventors carried out extensive research to overcome the foregoing problems of the prior art. Focusing on aluminum titanate ceramics excellent in cutting capability, the inventors made investigations to increase the heat resistance of such ceramics. For this purpose, the inventors pressed a mixture of $Al_2O_3$, $TiO_2$, specific additives and a small amount of an organic substance powder; sintered the obtained compact molded product in a closed container at a high temperature; and pulverized the obtained sintered product of aluminum titanate to give a powder of aluminum titanate. Then, it was found that in the obtained powder, the aluminum titanate was stably crystalized and the amount of impurities was very small. Thus the powder is suitable as a material for aluminum titanate ceramics. A further finding is as follows: when the obtained powder is molded, the molded product gives a heat-resistant ceramic molded product by being sintered at a relatively low temperature lower than the temperature conventionally applied for sintering the molded product of aluminum titanate because stable aluminum titanate crystals have already been formed in preparing the aluminum titanate powder. The present invention was completed based on these novel findings.

According to the present invention, there is provided a process for preparing a powder of aluminum titanate, comprising the steps of:

subjecting to pressure molding a mixture of 100 parts by weight of a mixture of $Al_2O_3$ and $TiO_2$ at a molar ratio of the former:the latter of 1:0.95–1.05, 2 to 5 parts by weight of $SiO_2$, 2 to 5 parts by weight of iron oxide calculated as $Fe_2O_3$ and 1 to 3 parts by weight of a powder of an organic substance to give a molded product;

sintering the molded product at a temperature of 1600 to 1700° C. in a closed container; and pulverizing the molded product.

According to the present invention, there is also provided a process for preparing a sintered body of aluminum titanate, comprising the steps of molding the powder of aluminum titanate prepared by the above-mentioned process and sintering the molded product at 1450 to 1550° C.

In the present invention, $Al_2O_3$, $TiO_2$, iron oxide, $SiO_2$, and a powder of an organic substance are used as raw materials.

Among the raw materials, $Al_2O_3$ and $TiO_2$ are the components which form aluminum titanate when sintered. These components are used at a molar ratio of $Al_2O_3$:$TiO_2$ of 1:0.95–1.05, preferably in an equimolar amount. Useful materials as $Al_2O_3$ and $TiO_2$ are not limited insofar as they are capable of forming aluminum titanate crystals on sintering. Usually they are suitably selected for use from the materials conventionally used as $Al_2O_3$ and $TiO_2$. Especially when activated alumina is used as $Al_2O_3$ and anatase-type oxide is used as $TiO_2$, aluminum titanate can be formed in a short time in a high yield due to a high reactivity of the two components.

Iron oxide serves to promote the sinterability of $Al_2O_3$ and $TiO_2$. Various iron oxides such as $Fe_2O_3$, FeO, mixtures thereof and the like can be used for this purpose. The amount of iron oxide used is about 2 to about 5 parts by weight, preferably about 3 to about 4 parts by weight, calculated as $Fe_2O_3$ per 100 parts by weight of the combined amount of $Al_2O_3$ and $TiO_2$.

$SiO_2$ prevents the diffusion of $TiO_2$ due to an increase in the viscosity of a melt of $Al_2O_3$ and $TiO_2$ on sintering thereof for forming aluminum titanate, thereby making it easy to obtain a melt of $Al_2O_3$ and $TiO_2$ in an equimolar amount. The amount of $SiO_2$ used is about 2 to about 5 parts by weight, preferably about 3 to about 4 parts by weight, per 100 parts by weight of the combined amount of $Al_2O_3$ and $TiO_2$.

The powder of an organic substance decomposes and dissipates on sintering of molded product formed from a mixture of raw materials, giving a porous structure to the molded product. There is no restriction on the powders of organic substances insofar as the powders decompose and dissipate at the sintering temperature without leaving any ash. Specific examples of the organic substance powder are powders of resins, powders of charcoal, etc. Useful organic substance powders are those having a particle size of preferably about 50 to about 5000 $\mu$m, more preferably about 100 to about 2000 $\mu$m. The amount of the organic substance powder used is about 1 to about 3 parts by weight, preferably about 2 to about 3 parts by weight, per 100 parts by weight of the combined amount of $Al_2O_3$ and $TiO_2$.

In the present invention, $Al_2O_3$, $TiO_2$, iron oxide, $SiO_2$, and the powder of an organic substance are uniformly mixed and subjected to pressure molding, giving a molded product having a high powder density. In the pressure molding, a pressure of about 300 to about 600 kg/cm$^2$ is preferably applied. A binder may be used as selected from binders conventionally used in preparing a sintered body. Specific examples of such binders are polyvinyl alcohol (PVA), microwax, carboxymethyl cellulose (CMC), ester of acrylic acid, stearic acid, etc. The amount of the binder used may be the same as the amount thereof conventionally used and is about 1 to about 5 parts by weight, per 100 parts by weight of the raw materials.

The shapes of molded products are not limited insofar as the molded products have a high powder density. A block shape is preferred from the viewpoints of easiness in molding and an efficiency in filling the molded product into a furnace for sintering.

Then the molded product is sintered in a closed container at a temperature of about 1600 to about 1700° C., preferably about 1600 to about 1650° C.

The molded product used in the sintering process is far smaller in surface area than in the form of a powder, because it was molded under a high pressure and made compact. Therefore in the sintering process, a co-melt of $Al_2O_3$ and $TiO_2$ in an equimolar amount is likely to form without diffusion of semi-molten $TiO_2$ to the surface of the molded product, so that stable aluminum titanate crystals are formed, also due to the effect of iron oxide and $SiO_2$ used as additives. During sintering, the oxygen in the closed container is consumed for the decomposition of powdery organic substance, whereby the oxidation of titanium or aluminum is hindered, and aluminum titanate ($TiAl_2O_5$) crystals are formed in a high yield. Further, the powdery organic substance used as the raw material decomposes and dissipates during sintering, so that the sintered product is obtained as a mass of porous structure, and is consequently easily pulverized into fine particles in a subsequent step.

Examples of the closed container include a muffle and the like. The molded product may be compactly filled into the container and sintered in a muffle furnace. It is preferable to fill the molded product into the container as compactly as possible. When required, the compactness may be increased by filling crushed fragments of molded product into the empty space in the container. The sintering time is a length of time required to form aluminum titanate, and is usually about 1 to about 5 hours.

Subsequently the sintered molded product is pulverized to give a powder of aluminum titanate. There is no limitation on pulverization methods. Since the molded product is made porous by decomposition and dissipation of powdery organic substance, it can be easily pulverized by methods such as dry pulverization using an atomizer or wet pulverization using a ball mill.

The thus obtained aluminum titanate powder has the following advantages. The aluminum titanate crystals can be formed in a high yield because the oxidation of titanium or aluminum is inhibited. Further advantageously the molded product is sintered at a high temperature using iron oxide and $SiO_2$ as additives, whereby the crystals are stabilized. Consequently the aluminum titanate ceramics produced by molding and sintering the aluminum titanate powder show high stability and excellent heat resistance even at a high temperature.

The particle size of the powder is not critical and may be in a range which is suitable, e.g. for a molding method for preparing the end product. When the molded product is pulverized to an average particle size of 0.6 μm or less, a high-density and compact molded product can be produced, and the resulting sintered body has high strength.

The aluminum titanate powder prepared by the foregoing process is molded in the required shape and sintered, whereby the contemplated sintered body of aluminum titanate is produced.

Molding methods are not limited and include compression molding, cast molding, extrusion molding, injection molding, hot press molding, sheet molding and the like. In the molding procedure, a binder may be added as conventionally done. Useful binders are polyvinyl alcohol (PVA), wax emulsion, carboxymethyl cellulose (CMC), ester of acrylic acid, stearic acid and the like.

The sintering temperature may be about 1450 to about 1550° C., preferably about 1500 to about 1550° C. The sintering time may be usually about 2 to 3 hours.

In preparing the aluminum titanate powder according to the present invention, a molded product of high powder density is sintered at a high temperature of 1600 to 1700° C. to give compact and stable aluminum titanate. Therefore, in the sintering procedure for producing a sintered body, the molded product need not be sintered at a high temperature to form stable crystals. Stated more specifically, a stable sintered body of aluminum titanate can be obtained by sintering the molded product at a temperature lower by approximately 50 to 150° C. than the sintering temperature of 1600 to 1700° C. used in forming a porous molded product for preparing the aluminum titanate powder. In this sintering procedure, sintering is conducted at a lower temperature than the sintering temperature for forming aluminum titanate crystals with the result that the stability of aluminum titanate is not impaired and the sintered body thus obtained possesses superior heat resistance and physical strength.

The sintered body obtained by said process is not apt to cause decomposition of aluminum titanate crystals even when heated to a high temperature and is suitable as heat-resistant parts for use at high temperatures in view of an unlikelihood of depressing the physical strength at high temperatures. Further the sintered body retains the high cutting capability of aluminum titanate and thus has high machinability. The sintered body is suited as an article employable at a high temperature for the following reasons. Due to the high purity of aluminum titanate, a film of oxidized impurity is not formed on the surface of the sintered body, the article is highly resistant to corrosion, and the article is unlikely to become wet, for example, when immersed in molten metal.

As described above, the process of the present invention gives a sintered body of aluminum titanate which is superior in cutting capability, precision machining property, heat resistance, corrosion resistance and non-wettability against molten metal.

The sintered body thus obtained can be used with good results because of its excellent properties. For example, it can be effectively used as a high-temperature employable product shown below:

(1) articles for measuring the temperature of molten metal in a blast furnace, electric furnace or the like;

(2) protective pipes for thermocouples and burner tiles in a blast furnace, electric furnace, incinerator or the like;

(3) articles for high-temperature portions of an automotive engine;

(4) fans, compressors, turbine burners and like engine components, exhaust components and the like for aircraft;

(5) surface insulating materials, e.g. for outer walls of spacecraft;

(6) crucibles for use in centrifugal casting process for producing artificial teeth;

(7) parts for high-temperature portions in electric or electronic devices such as IC, LSI, VLSI, printed boards, condensers, luminous elements, transformers, electric power devices, batteries and the like, e.g. a casing for electrodes in galvanic cells; and (8) parts in nuclear reactors such as shielding materials for use in nuclear fusion. reactors.

EXAMPLES

The present invention will be described below in more detail with reference to the following examples.

Example 1

Mixed together were 100 parts by weight of the combined amount of anatase-type titanium oxide and sinterable alumina (in an equimolar amount), 3 parts by weight of $SiO_2$, and 2 parts by weight of $Fe_2O_3$. The mixture was crushed in a ball mill by a wet pulverization method to produce a 325 mesh slurry. Then the slurry was dehydrated by filter press and dried with heating at 60° C. The dried product was pulverized into fine particles by an atomizer to give a powder as a raw material.

The raw material powder was mixed with 3 parts by weight of charcoal powder of less than 3000 $\mu$m in particle size and 5 parts by weight of microwax. The mixture was heated to 80° C. and mixed and pressed under a pressure of 300 kg/cm² to mold a cubic block measuring 50×130×20 mm. The block was filled into a muffle made of alumina. Crushed fragments of block were packed into a hollow space of the muffle to fill up the space with the block.

The muffle filled with the block was closed, heated at a rate of 50° C./hr to 950° C. and at a rate of 100° C./hr to 1650° C./hr and then sintered at 1650° C. for 2 hours, followed by spontaneous cooling. The obtained sintered clinker was pulverized by an atomizer and re-pulverized to less than 5 $\mu$m to give a powder of aluminum titanate.

Three parts by weight of microwax was mixed with 100 parts by weight of the obtained powder of aluminum titanate. The mixture was subjected to pressure molding at a pressure of 600 kg/cm² to mold a flat plate measuring 40×60×5 mm. The flat plate was placed into an electric furnace and heated at a rate of 100° C./hr to 1500° C. Then the plate was sintered at 1500° C. for 2 hours, and was left to cool, giving a sintered body of aluminum titanate. The density and bending strength of the obtained sintered body were measured and the results are shown below in Table 1.

Comparative Example 1

The procedure of Example 1 was repeated except that a raw material powder containing charcoal and microwax was placed into a sagger without molding in a block shape and was heated at an open state. The powder was sintered at 1650° C. for 2 hours in the same manner as in Example 1 and was pulverized to give a powder of aluminum titanate.

A sintered body of aluminum titanate was prepared in the same manner as in Example 1 using the obtained powder of aluminum titanate. The density and bending strength of the obtained sintered body were measured and the results are shown below in Table 1.

Comparative Example 2

An aluminum titanate powder was obtained in the same manner as in Comparative Example 1 except that the raw materials placed in a sagger were sintered at 1500° C. for 2 hours.

A sintered body of aluminum titanate was prepared in the same manner as in Example 1 using the obtained powder of aluminum titanate. The density and bending strength of the obtained sintered body were measured and the results are shown below in Table 1.

TABLE 1

| | Sintering conditions of raw materials | Temperature for sintering raw materials | Density of sintered body | Bending strength |
|---|---|---|---|---|
| Example 1 | Sintered in a muffle | 1650° C. | 3.45 | 650 kg/cm² |
| Comp. Ex. 1 | Sintered in an open state | 1650° C. | 3.25 | 400 kg/cm² |
| Comp. Ex. 2 | Sintered in an open state | 1500° C. | 3.05 | 550 kg/cm² |

As apparent from the results shown in Table 1, the powder of aluminum titanate prepared by the process of the present invention is excellent in sinterability and gives a compact sintered body merely by sintering at a relatively low temperature of 1500° C.

What is claimed is:

1. A process for preparing a powder of aluminum titanate, comprising the steps of:

subjecting to pressure molding a mixture of 100 parts by weight of mixture of $Al_2O_3$ and $TiO_2$ at a molar ratio of the former: the latter of 1:0.95–1.05, 2 to 5 parts by weight of $SiO_2$, 2 to 5 parts by weight of iron oxide calculated as $Fe_2O_3$ and 1 to 3 parts by weight of a powder of an organic substance to give a molded product;

sintering the molded product at a temperature of 1600 to 1700° C. in a closed container; and pulverizing the molded product.

2. The process according to claim 1, wherein $Al_2O_3$ is activated alumina and $TiO_2$ is anatase oxide.

3. The process according to claim 1, wherein the powder of organic substance has a particle size of 50 to 5000 $\mu$m.

4. A process for preparing a sintered body of aluminum titanate, comprising the steps of molding the powder of aluminum titanate obtained by the process of claim 1 and sintering the molded product at 1450 to 1550° C.

* * * * *

UNITED STATES PATENT AND TRADEMARK OFFICE
CERTIFICATE OF CORRECTION

PATENT NO. : 6,197,248 B1 Page 1 of 1
DATED : March 6, 2001
INVENTOR(S) : Fukuda et al.

It is certified that error appears in the above-identified patent and that said Letters Patent is hereby corrected as shown below:

<u>Title page,</u>
Item [75] change the first name of the first inventor, Tsumoto" to be -- Tsumotu --

Signed and Sealed this

Eighth Day of January, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,197,248 B1
DATED : March 6, 2001
INVENTOR(S) : Fukuda et al.

It is certified that error appears in the above-identified patent and that said Letters Patent is hereby corrected as shown below:

<u>Title page,</u>
Item [75], change the first name of the first inventor, "Tsutomo" to be -- Tsutomu --.

This certificate supersedes the Certificate of Correction issued January 8, 2002.

Signed and Sealed this

Twentieth Day of August, 2002

*Attest:*

*Attesting Officer*

JAMES E. ROGAN
*Director of the United States Patent and Trademark Office*